May 21, 1935.  F. S. COLE  2,002,259
ANIMAL DEN
Filed Aug. 7, 1934

Inventor
Florent S. Cole
By George E. Cook.
Attorney

Patented May 21, 1935

2,002,259

UNITED STATES PATENT OFFICE 2,002,259

ANIMAL DEN

Florent S. Cole, Omro, Wis.

Application August 7, 1934, Serial No. 738,860

5 Claims. (Cl. 119—19)

The present invention relates to animal breeding kennels and more particularly to a kennel adapted for breeding foxes.

One of the primary objects of the invention is the provision of a kennel of the character indicated which is substantially weather-proof, easily cleaned, capable of being constructed at low cost, and having an interior which will tend to prevent damage to fine pelts.

The above and other advantages will be readily apparent from the accompanying drawing when taken with the more detailed description hereinafter appearing.

Figure 1:
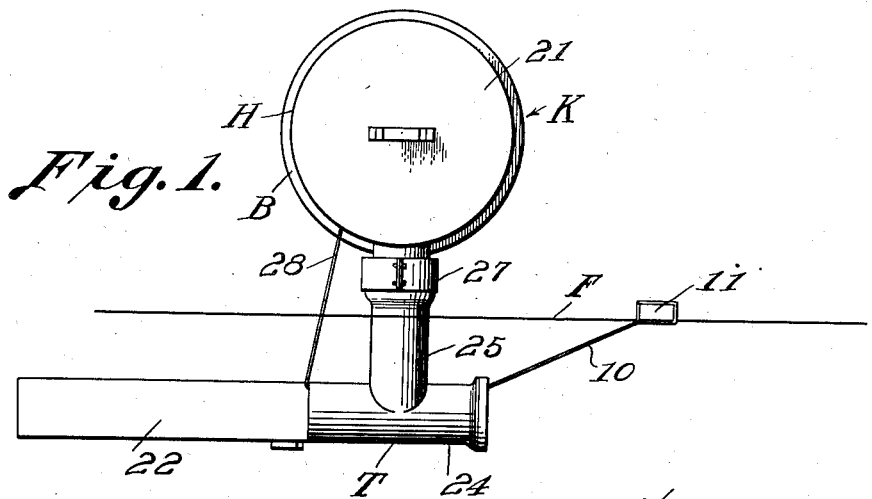
Figure 1 is a plan view of my improved kennel showing its location with reference to a yard surrounded by a wire fence in which the animals are held captive.
Figure 2:
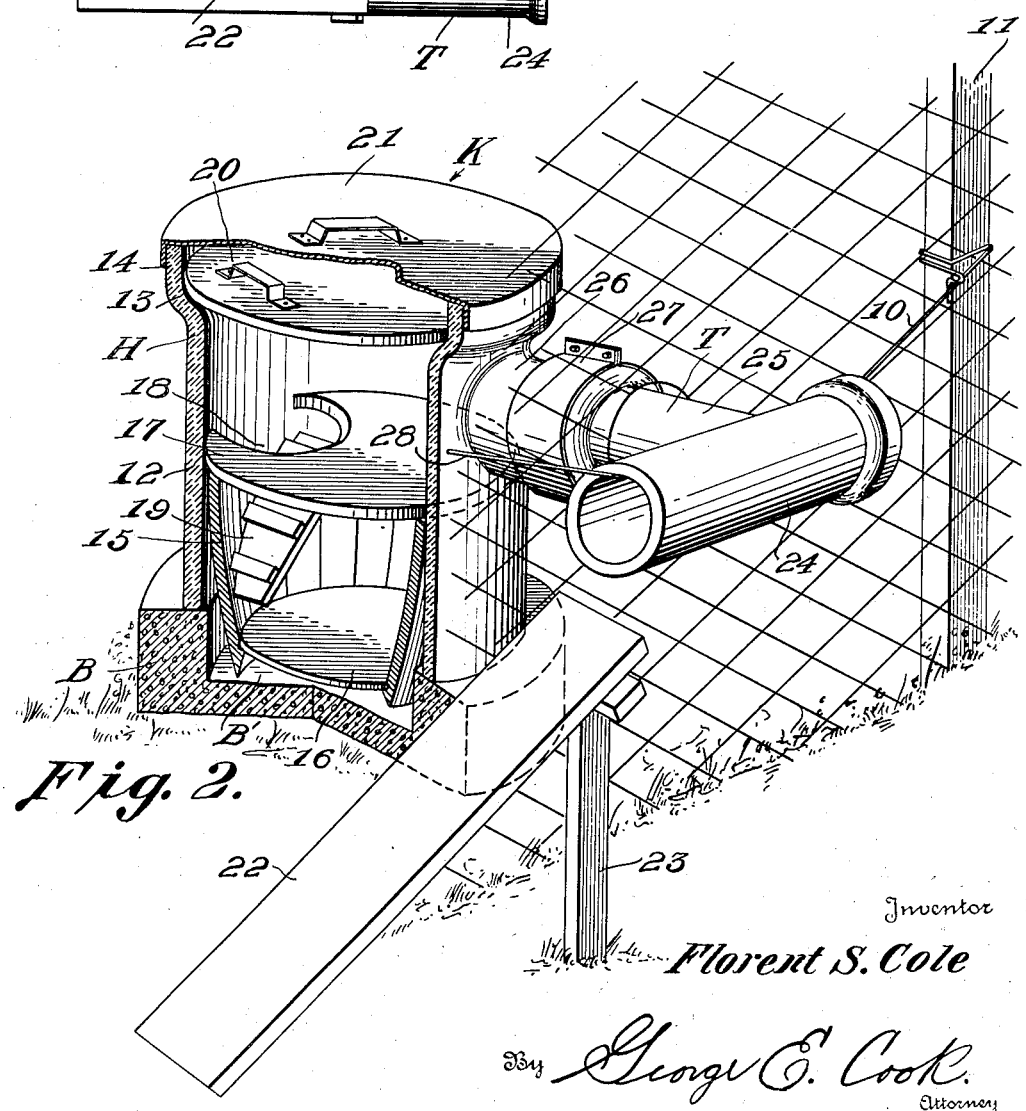
Figure 2 is a perspective view partly broken away to more clearly show the interior of the kennel proper.

Referring first to Figure 1, there is shown my kennel generally designated as K, having a housing portion H into which leads a pipe system T providing a passageway. The housing, as will be seen, is located without a wire fence F through which a portion of the pipe system T passes to the interior of the yard, the pipe system being held in position by a guy wire 10 embracing one of the fence posts 11. Experience has shown that animals of the fox family prefer to have their kennel removed from the yard within which they are held captive and the position of the kennel housing with relationship to the wire fence, as illustrated, has been found highly satisfactory.

The housing H is characterized by a concrete base B set in the ground adjacent the fence F. As will be seen the base is preferably of circular outline and as exemplary of operative dimensions may be approximately twenty-eight inches in diameter and eight inches high. There is also provided interiorlly of the perimeter of and sunk within the base a counter base B', which may have operative dimensions of twenty-three inches in diameter and depth of six inches. It will be understood that the measurements given are merely illustrative and in no sense restrictive. It will be appreciated that the base B may be constructed without the counter base B' and the kennel may be located entirely inside of the enclosure in which the animal is held captive.

Positioned upon the base B near the perimeter of the counter base B' is a cylindrical hollow tile pipe 12 which is flared adjacent its upper edge as at 13 to provide a rim 14 of greater diameter than the rim end which sits on base B. Resting within the counter base B' is an interior, removable housing or nest 15, which is preferably one-half of a barrel with its bottom 16 left in place to form a floor. A cover 17 rests on the upper edge of the barrel housing 15 and is cut away at 18 to provide an opening. A stair-way 19 leads from bottom 16 to cover 17, thus providing lower and upper dens within the housing H, the former being normally occupied by the female fox and the young fox pups, while the male fox rests in the upper den. The stair-way 19, which is nailed to the side of nest 15, permits access from lower to upper dens, and vice versa, while the smooth interior surface of tile 12 tends to prevent injury to the pelts of the foxes.

A lid 20 rests on the flared neck 13 of the tile 12, while covering the entire housing is a flanged lid 21, both lids being provided with handles, as shown. The outer cover is preferably locked in place and may be opened by the keeper to gain access to the interior of the dens for removal of their occupants, or access to the barrel nest 15 if it is desired to remove same to be cleaned.

The animals gain access to the kennel proper by means of a runway 22 supported by props 23, or it may be suspended from pipe system T by means of wire guys or the like. A hollow tile pipe 24, open at both ends, is connected to hollow pipe 25 positioned at right angles thereto, which latter pipe passes through fence F and is joined to a tubular member 26 integral with the housing H. The joint may be made secure with a metal band such as 27, or any other suitable means. It will now be appreciated that the animals will enter the housing H with the aid of the run-way and by passing through hollow pipes 24, 25, and 26, constituting the pipe system T. A guy wire 28 may also be provided to additionally brace the pipe 24 to the housing H.

It has been found that a kennel such as described may be readily made weather-proof by sealing the line of union of the tile 12 with the base B. Also it has been observed that young fox pups thrive in the kennel to which easy access may be had by the keeper through removal of the lids 20 and 21. Further, the pups easily find their way out of the kennel when of proper age, while the presence of the male animal in the upper compartment or den aids in keeping the kennel warm.

Various modifications may be made in the specific details illustrated and it is my desire to cover all such and be limited in this respect only as may be necessary by the scope of the claims hereto appended.

I claim:

1. An animal kennel comprising a base, a tile housing having an outwardly flared upper edge mounted on the base, a removable cover within the housing resting on the flared portion of the edge, a second removable cover resting on and covering the edge, a nest within the housing, and a pipe system connected to the housing to permit entrance to the kennel.

2. An animal kennel comprising a base, a tile housing having an outwardly flared upper edge mounted on the base, a removable cover within the housing resting on the flared portion of the edge, a second removable cover resting on and covering the edge, a nest within the housing, a hollow tubular member integral with the housing and a tile pipe system joined to the tubular member.

3. An animal kennel comprising a base having an interior recessed portion, a cylindrical tile housing resting on the portion of the base that surrounds the recessed portion, a nest resting within the latter, a cover for the nest forming with the interior of the housing a den above the nest, and means to permit entrance to the kennel.

4. An animal kennel comprising a base having an interior recessed portion, a cylindrical housing resting on the portion of the base that surrounds the recessed portion, a nest resting within the latter, a cover for the nest forming with the interior of the housing a den above the nest, a stair connecting the den and nest, and a pipe system joined to the side of the housing.

5. An animal kennel comprising a base, a tile housing having an outwardly flared upper edge mounted on the base, a removable cover within the housing resting on the flared portion of the edge, a removable nest and cover therefor within the housing, said last mentioned cover forming the bottom for a den above the nest, a stairway joining the nest and den, a hollow tubular member integral with the housing to permit entrance to the den, and a tile pipe connected to the member.

FLORENT S. COLE.